Aug. 13, 1968  E. JONES  3,396,940
PACKLESS VALVE WITH ANTI-FROST MEANS
Filed Feb. 17, 1966

INVENTOR
EVAN JONES
BY Greist, Lockwood,
Greenawalt & Dewey   ATT'YS.

United States Patent Office 3,396,940
Patented Aug. 13, 1968

3,396,940
PACKLESS VALVE WITH ANTI-FROST MEANS
Evan Jones, Evanston, Ill., assignor to Henry Valve Company, Melrose Park, Ill., a corporation of Illinois
Filed Feb. 17, 1966, Ser. No. 528,285
4 Claims. (Cl. 251—335)

This invention relates to an anti-frost means for valves and more particularly is directed to a new and improved anti-frost means particularly adapted for use with packless type valves. More specifically stated, the anti-frost means provides a unique valve stem sealing arrangement especially adapted to prevent the collection of moisture or other foreign matter around the stem and behind a valve diaphragm element and includes among various other advantages, the provision of pressure equalization during valve operation to prevent the drawing in of foreign material into the diaphragm chamber when the valve is opened and closed.

Packless diaphragm valves are used to a great extent in refrigeration equipment because the packing or seals in conventional valves become hard and rigid at low temperatures losing their sealing effectiveness and resulting in a loss of the refrigerant fluid, liquid oxygen, liquid nitrogen or the like. Packless valves utilize a flexible diaphragm mounted across the valve body and functioning to isolate or seal off the operating stem from the movable seat member, the latter being positioned on the opposite side of the diaphragm and directly exposed to the low temperature fluid pressure. One form of diaphragm valve exemplary of this construction is disclosed in my earlier Patent No. 2,895,497, issued July 21, 1959. This patent, among others, typifies the utilization of a diaphragm-type sealing arrangement which is functional at low temperatures. It is to be understood that the present invention is not limited to diaphragm-type valves wherein the diaphragm is used as a sealing element or functions with an additional element to provide a seal, but may be used with other known forms of diaphragm valves and valve structures in which the problem outlined is present. When known forms of diaphragm valves are used with refrigeration equipment and fluid handling equipment for liquid oxygen, nitrogen and the like, they operate satisfactorily as long as kept at a low temperature. However, when the flow of low temperature fluid is interrupted, the layer of frost which collects on the valve body and bonnet melts, and may be easily drawn into the chamber housing the diaphragm. Subsequently, when the valve is opened, the low temperature fluid or refrigerant freezes the entrapped moisture to prevent subsequent operation of the valve, or even if operable, the solid deposit can damage the flexible diaphragm. Attempts have been made to overcome this problem by sealing the stem at the bonnet, however, this has not been without its shortcomings inasmuch as a tight seal is difficult to maintain where the internal volume defined between the diaphragm and the seal is subject to change during valve operation. Also the proximity of the seal to low temperatures impairs its effectiveness.

The present invention relates to a new and improved stem sealing arrangement consisting of a cap member providing a seal for the valve stem covering a substantial portion of the valve bonnet to preclude the collecting of frost, foreign material, and the like in the region of the diaphragm and valve stem. The novel seal cap defines with the diaphragm, a volume which remains substantially constant throughout valve operation, therefore, not subject to drawing in moisture laden air or the like when operated. Accordingly, reliability in operation is assured.

It is an object of the present invention to provide a new and improved valve structure having as a part thereof a novel valve stem sealing arrangement which efficiently functions to establish and maintain a dynamic field between the stem and valve body on an area substantially removed from the valve body.

Another object is to provide a new and improved diaphragm valve structure having a special cup-like seal cap functioning as an external stem and body seal to prevent moisture accumulation behind the diaphragm within the valve body and which acts to insulate the valve bonnet to improve valve operation.

Still a further object of this invention is to provide a new and improved valve structure having a novel cup-like seal cap extending from the valve body to the valve stem to provide a dynamic sealing arrangement to prevent the ingress of moisture into the valve body and which forms with the diaphragm in the valve a volume which remains substantially constant irrespective of the flexing of the diaphragm during opening and closing of the valve stem.

Other objects not specifically set forth will become apparent from the following detailed description of the invention made in conjunction with the accompanying drawings wherein.

Figure 1:
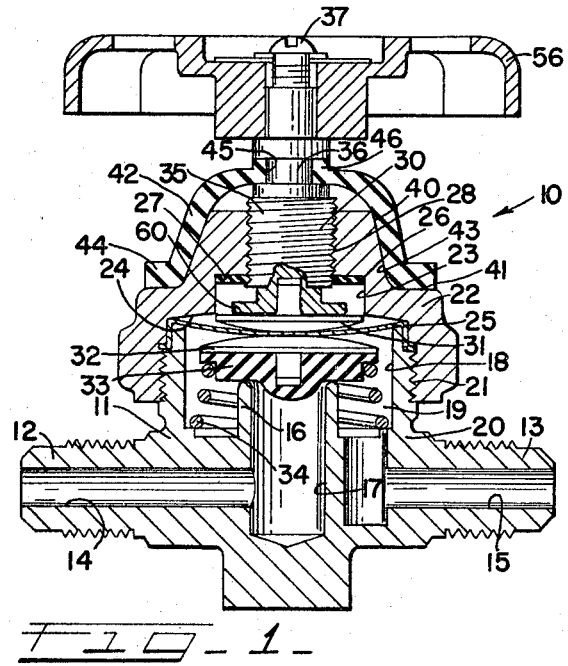
FIG. 1 is an axial cross section of an improved diaphragm-type valve incorporating the principles of the present invention with the valve being illustrated in the closed position.
Figure 2:
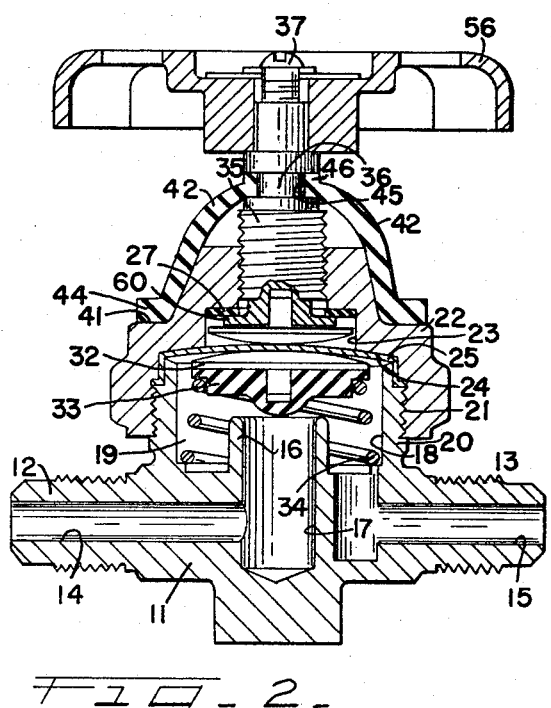
FIG. 2 is a view similar to FIG. 1 with the valve in the open position.

Referring now to FIGS. 1 and 2, the valve indicated generally by the reference numeral 10 consists basically of a body portion 11 formed with a pair of oppositely directed connecting nipples 12 and 13 which may be threaded or of any equivalent design to facilitate attachment into a fluid handling system. Each of the nipples 12 and 13 is provided with an annular bore 14 and 15 forming inlet and outlet portions and communicating with each other through an upstanding wall portion 16 which forms a vertical passage 17 terminating in a valve seat. The exterior surface of the upwardly projecting wall portion 16 forming the valve seat defines with an internal bore 18 a fluid flow chamber 19. Fluid entering the inlet 14 may flow through the vertical chamber 17 into the chamber 19 and out the outlet 15, so long as the valve is in the open condition.

The outer portion of the wall 20 forming the fluid flow chamber 19 is provided with threads 21 which threadably receive a valve bonnet 22 of known type having an enlarged internal bore 23 joined to the threaded section through a shallow frusto-conical wall portion 24. A thin flexible diaphragm 25 is clamped between the valve body 11 and the valve bonnet 22, and when under pressure is backed by the wall portion 24 as shown in FIG. 2.

The upper end of the cylindrical bore 23 is defined by a radially extending annular wall portion 26 which forms a mounting area for a back seating seal member 27. At the inner end of the radial wall portion 26 is provided a threaded bore 28 which receives an externally threaded valve stem 30 having a button-like bearing plate 31 supported for relative rotation in the lowermost end. The bearing plate 31 non-rotatably engages the central section of the annular diaphragm and serves to flex the diaphragm in response to axial movement of the stem 30 brought about by rotation during opening and closing.

The diaphragm 25 may be formed of any suitable material or combination of material which will retain good flexibility in the temperature region in which it is designed to operate. By way of example, the diaphragm may be formed from a combination of thin strips of bronze and stainless steel or a combination of diverse types of bronze and stainless steel.

The diaphragm 25 forms a part of the means which seals the valve operator or stem from the fluid flowing through the valve. The lower face of the diaphragm 25 engages a valve seating bearing plate 32 which is similar in construction to the bearing plate 31 being provided with an axially projecting cylindrical portion which is positioned within an annular seat gasket 33. The seat gasket and bearing plate are held in contact by a biasing spring 34 which urges the annular sealing gasket 33 against the stem bearing plate 32 and which urges the diaphragm 25 against the bearing plate 31 at the lower end of the stem 30. The annular seating gasket 33 is adapted for engaging the fixed seat at the top of the wall portion 16 to interrupt fluid flow between the inlet 14 and outlet 15 in a known manner.

The lower end of the stem 30 is provided with an annular flange 60 which provides a thrust surface for the bearing plate 31 and also forms a back seating surface for engagement with a back seating gasket 27. Immediately above the threads 35 on the valve stem 30 is provided a reduced diameter portion having an annular groove 36 of still further reduced diameter. The upper end of the stem receives a handle 36 which is held to the stem by means of a fastener 37 received in a tapped opening (not shown) in the end of the stem 30.

The upper end of the bonnet 22 is formed to a frusto-conical circumferential surface 40 which arcuately merges into a radially directed shoulder 41, the outer limit of which is defined by an axially directed portion of the bonnet and on which tool pads may be provided. A flexible and impervious seal cap member 42 is of cup-like shape having an enlarged opening 43, which is defined by a radially extending flange 44, overlies the radial surface 41 of the bonnet with the main body of the seal cap member 42 snugly received over a frusto-conical surface 40. If desired, an adhesive or the equivalent may be used to secure the cap 42 to the valve bonnet 22.

Figure 3:
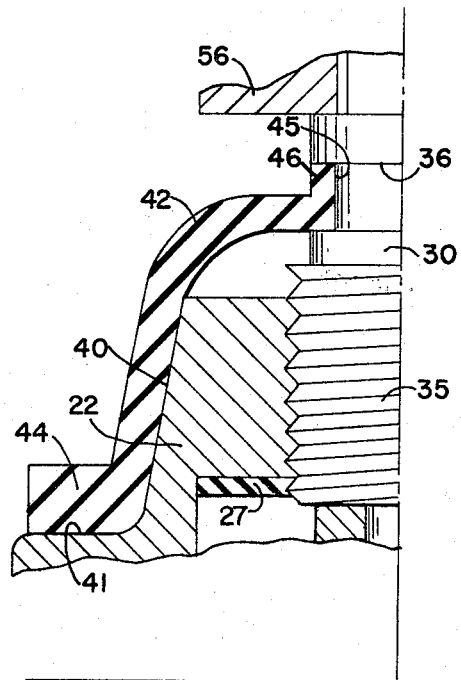
FIG. 3 is an enlarged fragmentary half-section of the bonnet and stem with the cup-like seal cap being illustrated in cross section.

An opening 45 is formed in the opposite or smaller end of the seal cap member 42 to accommodate the valve stem 30. The seal cap member 42 is provided with an axially extending thickened flange 46 at the opening 45 to reinforce the same, and is of sufficient radial and axial dimension to fill the groove 36 as is best seen in FIG. 3. Since the flange 46 is coextensive with the stem 30 the thickened flange portion 46 on the seal cap 42 not only fills the groove 36, but also provides a dynamic seal at the opening 45 as well as along the side walls of the groove 36. Thus, when the valve handle 36 is rotated to the open position as shown in FIG. 2, the flange 46 on the seal cap 42 permits the stem to rotate relatively thereto while following it in its upward travel to maintain the volume defined by the seal cap 42 and the diaphragm 25 substantially constant. This prevents the seepage of moisture or foreign matter along the stem 30 into the threaded bore 28 and the area above the diaphragm 25. Accordingly, formation of ice which would interfere with the efficient operation of the valve is positively prevented. In addition, the seal cap 42 overlying the bonnet 22 acts as an insulator preventing frost build-up on the bonnet 22.

Several advantages arising from the use of the unique stem and body seal cap arrangement described above may be obtained with different types of valves, in addition to being particularly useful with diaphragm-type valves because of their widespread use in low temperature applications. The maintaining of a constant volume entrapped between the diaphragm 25 and the seal cap 42 resists any pumping of foreign material bearing outside air into and out of the chamber as would occur in types having a fixed type seal engaging the stem. In addition, the seal cap 42 always covers the threads 30 to prevent dust and other foreign material from collecting on the bonnet and stem which could interfere with the smooth opening and closing movement.

Upon a consideration of the foregoing, it will become obvious to those skilled in the art that various modifications may be made without departing from the invention embodied herein. Therefore, only such limitations should be imposed as are indicated by the spirit and scope of the appended claims.

I claim:

1. A diaphragm-type valve comprising a valve body provided with inlet and outlet ports in communication with each other through an interposed valve seat, a valve element in said valve body including sealing means movable into engagement with said valve seat to interrupt fluid communication between said ports, a valve bonnet joined to said valve body, a valve stem threadedly mounted in said valve bonnet for rotational and reciprocating movement within said valve body, said valve stem at its inner end being engaged with said sealing means to move the same toward and away from said valve seat, said sealing means including diaphragm means sub-dividing the interior of said valve body into a stem receiving area and a fluid flow area wherein said valve seat is located, a flexible impervious cup-like seal cap means having an enlarged open end fluidtightly received around a portion of said valve bonnet, an opening in said cup-like seal cap means through which said valve stem fluidtightly extends, said diaphragm means and said cup-like impervious seal cap means defining with said bonnet a volume which remains substantially constant regardless of the position of said valve stem.

2. The diaphragm valve of claim 1 wherein said valve stem is provided with an annular groove and said cup-like seal cap means is formed with a thickened portion at said opening through which said valve stem extends, said thickened portion substantially filling said annular groove to form a rotatable seal with said valve stem.

3. In a diaphragm-type valve having a valve body provided with inlet and outlet ports in communication with each other through an interposed valve seat, a valve element in said valve body including sealing means engageable with said seat to interrupt communication between said inlet and outlet portions, a valve stem mounted for reciprocating movement into said valve body and being engaged with said sealing means to move the same toward said valve seat, said sealing means including diaphragm means sub-dividing the interior of said valve body into a stem receiving area and a fluid flow area wherein said sealing means is located, the improvement which comprises elastomeric cup-like seal cap means extending over and held fluidtightly to an exterior portion of said valve body and extending from said valve body to said valve stem, said cup-like seal cap means being fluidtightly received around said stem to define with said diaphragm means a volume which remains substantially constant irrespective of the position of said valve stem to avoid pumping during opening and closing movements of said valve stem.

4. The improvement in diaphragm-type valves of claim 3 wherein an annular groove is formed in said stem and a thickened axial flange portion is formed on said cup-like seal cap means, said axial flange portion being received in said annular groove with a fluidtight sliding fit permitting relative rotation between said stem and said cup-like seal cap means.

References Cited

UNITED STATES PATENTS

| | | | |
|---|---|---|---|
| 2,322,010 | 6/1943 | Fowler | 74—18.2 XR |
| 2,702,023 | 2/1955 | Seeloff | 74—18.2 XR |
| 2,715,009 | 8/1955 | Beekley | 251—335.1 |
| 3,067,775 | 12/1962 | Brueder | 251—54 XR |
| 3,126,194 | 3/1964 | Franck | 251—335 XR |

FOREIGN PATENTS

| | | |
|---|---|---|
| 483,942 | 6/1952 | Canada. |
| 632,330 | 1/1962 | Italy. |

SAMUEL SCOTT, *Primary Examiner.*